US006520284B2

(12) United States Patent
Spannbauer et al.

(10) Patent No.: US 6,520,284 B2
(45) Date of Patent: Feb. 18, 2003

(54) AIR INTAKE DEVICE COMPRISING A DUCT SECTION PROVIDED WITH OPENINGS

(75) Inventors: Helmut Spannbauer, Ludwigsburg (DE); Matthias Alex, Heilbronn (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 4 days.

(21) Appl. No.: 09/916,209

(22) Filed: Jul. 27, 2001

(65) Prior Publication Data

US 2002/0029927 A1 Mar. 14, 2002

Related U.S. Application Data

(63) Continuation of application No. PCT/EP99/08826, filed on Nov. 17, 1999.

(30) Foreign Application Priority Data

Jan. 27, 1999 (DE) ........................................ 199 03 165

(51) Int. Cl.[7] ................................................ F02K 11/00

(52) U.S. Cl. ....................... 181/214; 181/229; 181/224; 181/241

(58) Field of Search ................................ 181/229, 227, 181/241, 249, 255, 224, 214, 272

(56) References Cited

U.S. PATENT DOCUMENTS 3,712,416 A * 1/1973 Swanson et al. ............ 181/229
3,966,014 A * 6/1976 Gowing ....................... 181/229
5,979,598 A * 11/1999 Wolf et al. ................. 181/272

FOREIGN PATENT DOCUMENTS

DE 1642857 8/1952

* cited by examiner

*Primary Examiner*—Khanh Dang
(74) *Attorney, Agent, or Firm*—Crowell & Moring LLP

(57) ABSTRACT

A duct or conduit section (10) for installation, in particular, in an air intake system of an internal combustion engine, in which the duct section is composed of two shells (14) which are joined by a snap connection (15). Openings located in the parting seam or joint (16) between the shells (14) are produced by recesses in the half shells. These openings each have a cross-sectional area of less than 7 $mm^2$ and are useful for suppressing noise resulting from the air intake. As a result of the openings, vibration-inducing forces exerted on adjacent components in the engine compartment due to pulsations in the intake tube, can be minimized or avoided. Also, the quantity of additional air drawn in from the engine compartment, which is undesired because it is too warm, is decreased.

8 Claims, 1 Drawing Sheet

AIR INTAKE DEVICE COMPRISING A DUCT SECTION PROVIDED WITH OPENINGS

CROSS REFERENCE TO RELATED APPLICATIONS

This application is a continuation of international patent application no. PCT/EP99/08826, filed Nov. 17, 1999, designating the United States of America, the entire disclosure of which is incorporated herein by reference. Convention priority is claimed based on Federal Republic of Germany patent application no. DE 199 03 165.7, filed Jan. 27, 1999.

BACKGROUND OF THE INVENTION

The invention relates to an intake device, particularly for an internal combustion engine, with a duct section that is provided with noise supressing openings.

Adding openings, particularly bores, is described for instance in DE 1642857. According to this document, the air intake of an air filter housing is provided with a series of bores. To limit the number of bores for production reasons the bores are made in a size large enough to obtain the desired acoustic effect. The bores create short circuits between the tube volume and the environment on the other side of the tube wall. This suppresses or reduces the formation of stationary waves inside the tube and thus dampens the intake noise.

The environment of the tube is normally the engine compartment in which additional engine components are installed. The short circuit between the engine compartment and the interior of the tube, however, causes the pulsation of the intake air to induce vibrations in other components inside the engine compartment. As a result, additional vibration dampening measures may be necessary. Furthermore, hot air from the engine compartment may be sucked in through the bores, which decreases the performance of the internal combustion engine. Moreover, providing the bores in the tube connection involves additional production costs and reduces the economic efficiency of the component. These costs can be kept within limits only by providing a small number of bores.

A fabric hose, which has some air permeability with respect to the environment, could be provided as the duct section. These components have optimal acoustic properties, but they are expensive to produce. In addition, their connection to the intake device involves additional production and assembly costs.

SUMMARY OF THE INVENTION

The object of the invention is to create a duct section, particularly for the intake system of internal combustion engines, which has optimal noise dampening properties.

Another object of the invention is to provide a noise damping air intake duct section which is economical to produce.

It is also an object of the invention to provide an air intake duct section with little or not tendency to cause vibrations in adjacent components within the engine compartment.

These and other objects are achieved in accordance with the present invention by providing an air intake device for an internal combustion engine for installation in an engine compartment in which other components of the internal combustion engine are arranged, in which the air intake device comprises a duct section for guiding intake air, and the duct section is provided with a plurality of openings that open into the engine compartment arranged in at least one row extending axially along the duct, and the openings each have a cross sectional area of less than 7 $mm^2$.

The intake device according to the invention comprises a duct section with a series of openings. These openings have a cross section of less than 7 $mm^2$. Compared to the prior art, a larger number of openings can therefore be provided in the duct section, while the total cross section of all the openings combined remains the same or is even smaller. This makes it possible substantially eliminate, or at least to minimize, the vibration inducing influences on components adjacent to the duct section due to pulsation effects in the air intake.

According to one advantageous embodiment of the inventive concept, the openings are configured as round holes. They can then be produced in the form of bores in the wall of the duct section. If the duct section is made of plastic, a greater number of bores may be provided therein while still satisfying economic considerations. Advantageously, the bores have a diameter of about 1.5 mm. It has been shown that rows of bores with a 1.5 mm diameter result in an even greater degree of noise attenuation afforded by the duct section within the problematic frequency range of 100–300 Hertz than would be possible with a fabric hose of the same dimensions as the duct section provided with the bores.

According to one advantageous embodiment of the invention, the duct section is comprised of at least one molded part, especially a part made of a synthetic resin material (i.e., plastic). In this case, the openings may be created by appropriately configuring the mold. As a result, no additional production step to make the openings is required. In this variant, the cross section of the openings does not have to be round. Here, too, it is advantageous if the openings each have a cross sectional area corresponding to bores of 1.5 mm in diameter.

A further embodiment of the invention provides that the openings be formed in the parting seam between two molded parts. The molded parts can then be assembled and joined together by a snap connection. Leakage in the parting seam between the castings can be tolerated. In fact, leakage can further improve intake pipe acoustics and can be used deliberately for this purpose. Arranging the openings in the parting seam of the housing sections has the advantage of requiring only minor modifications in the shape of the housing mold in the edge area. It is even possible to make such modifications in the mold at a later time, for instance if it turns out that the acoustics of an intake system that is almost ready for mass production could be further improved.

From an acoustics point of view, it is particularly advantageous to arrange the openings in one or more rows extending in the direction of air flow through the tube, i.e., axially along the tube. This makes it possible to effectively reduce the formation of standing waves in the attenuating duct section over a larger frequency range. Noise damping is thus facilitated over a greater frequency spectrum.

According to another embodiment of the invention, the duct section can be provided with a cross section that increases in flow direction to enhance the air intake into the duct section. This diffuser-type configuration enhances the air intake into the tube section. This is due to the recovery of speed energy from the pressure loss that occurs at the input of the duct section.

According to another advantageous embodiment of the invention, the cross sectional area of the duct section can be variable. The cross section is changed by a control element, which forms a portion of the wall of the duct section. The openings may be formed both in the stationary parts of the wall and in the control element. The control element may be configured for different cross-sectional shapes. It is feasible, for instance, to vary the angle of the opening of the diffuser. Another possibility is to provide a constant cross-sectional area of the duct section over the length of the control element. This cross-sectional area can then be varied by actuating the control element.

These and other features of preferred embodiments of the invention, in addition to being set forth in the claims, are also disclosed in the specification and/or in the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
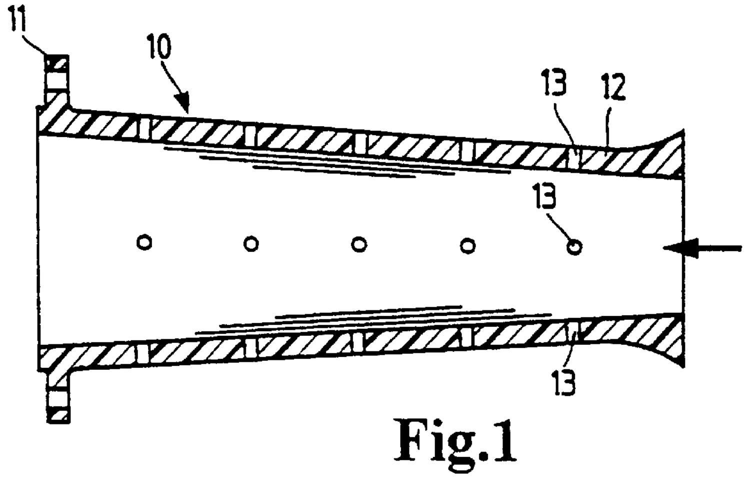
FIG. 1 is a longitudinal section of an air intake in the form of a duct section which can be integrated into an intake device and which is provided with bores in the duct wall.

FIG. 1 shows the basic construction of a duct section suitable for installation in an intake device for an internal combustion engine. The.duct section is used as an untreated air intake and is fixed to the intake device by a flange 11. The direction of air flow through the duct is indicated by an arrow. The circular cross sections linearly increase in the direction of flow. This creates a diffuser effect in the duct section. A tube wall 12 is provided with four rows of bores 13, which have a cross section of less than 7 $mm^2$ each. The resulting rows of holes are offset along the circumference of the tube wall by 90°.

Figure 2:
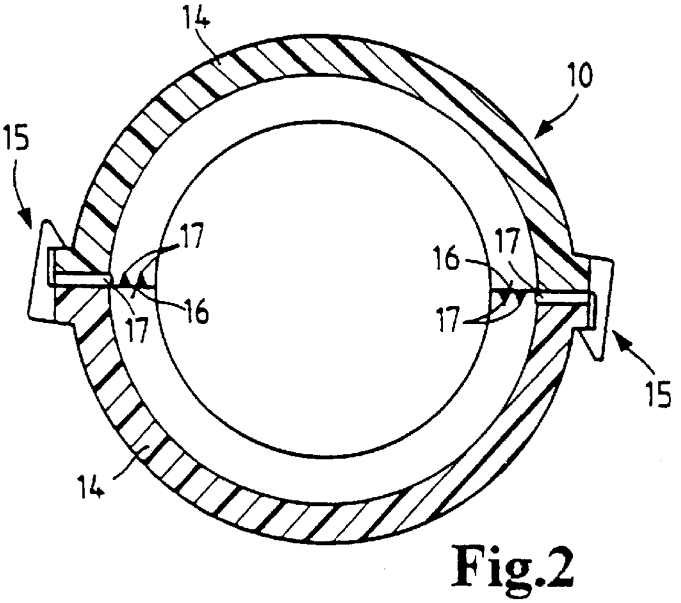
FIG. 2 shows an air intake comprised of two shells that are snapped together, with openings formed along the parting seams.

FIG. 2 shows a cross section through the duct section 10, which has substantially the same geometry as that shown in FIG. 1. The duct section according to FIG. 2, however, comprises two half shells 14, which are joined by a snap connection element 15. In a parting seam 16 between the half shells 14, indentations are provided at regular intervals, which create the openings 17 in the tube wall. The snap connection elements 15 are arranged in such a way that they engage the intake duct shells in an area between two openings. If the half shells 14 are designed appropriately, they can be produced in the same mold. This saves the cost for a second mold.

Figure 3:
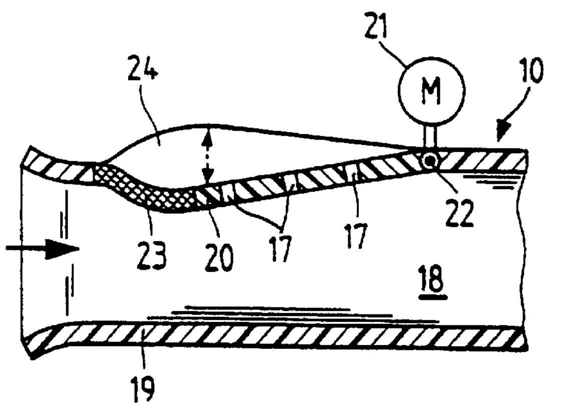
FIG. 3 is a longitudinal section through a motor-driven variable diffuser provided with a control element comprising a wall portion with openings.

FIG. 3 shows a possible embodiment of a variable diffuser 18. This diffuser has a rectangular cross section. Three walls of the cross section are formed as a fixed base body 19. The fourth wall is essentially a control element 20 driven by a schematically indicated motor 21. The control element is rotatably supported in the base body via a hinge 22. On the opposite side, the control element 20 is connected to the base body via a flexible wall section 23. The motor-driven control element is moved about the hinge axis, so that the linear cross section of the variable diffuser 18 inside the duct section 10 can be varied. The control element shears along the sidewalls 24 of the base body. A seal or a sealing gap may be provided between these two components. The sealing gap, like the openings 17 in the control element 20, can be used to exert a positive influence on the intake acoustics. If desired, adhesives or vulcanization may be used to connect flexible wall section 23 to control element 20 and to base body 19.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. An air intake device for an internal combustion engine for installation in an engine compartment in which other components of the internal combustion engine are arranged, said air intake device comprising a duct section for guiding intake air, wherein said duct section is provided with a plurality of openings that open into the engine compartment arranged in at least one row extending axially along the duct, said openings each having a cross sectional area of less than 7 $mm^2$.

2. An intake device according to claim 1, wherein said openings are round holes.

3. An intake device according to claim 1, wherein the duct section is comprised of at least one molded part in which the openings are formed by the mold.

4. An intake device according to claim 3, wherein said molded part is formed of molded synthetic resin material.

5. An intake device according to claim 3, wherein the openings are formed in a parting seam between two molded parts which make up the duct section.

6. An intake device according to claim 5, wherein said molded parts are tubular half shells.

7. An intake device according to claim 1, wherein the duct section has a cross section which increases in the direction of air flow therethrough.

8. An intake device according to claim 1, wherein said duct section further comprises a control element for varying the cross section of the duct along at least a portion of the duct length.

* * * * *